(12) United States Patent
Wu et al.

(10) Patent No.: US 9,589,540 B2
(45) Date of Patent: Mar. 7, 2017

(54) ADAPTIVE CONTROL OF DISPLAY REFRESH RATE BASED ON VIDEO FRAME RATE AND POWER EFFICIENCY

(75) Inventors: Yongjun Wu, Bellevue, WA (US); Shyam Sadhwani, Bellevue, WA (US); Naveen Thumpudi, Redmond, WA (US); Stephen Estrop, Carnation, WA (US); Glenn Evans, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 13/310,812

(22) Filed: Dec. 5, 2011

(65) Prior Publication Data
US 2013/0141642 A1 Jun. 6, 2013

(51) Int. Cl.
| | |
|---|---|
| G06F 3/14 | (2006.01) |
| G09G 5/12 | (2006.01) |
| G09G 5/36 | (2006.01) |
| G06F 1/32 | (2006.01) |
| G09G 3/20 | (2006.01) |

(52) U.S. Cl.
CPC ........... G09G 5/363 (2013.01); G06F 1/3265 (2013.01); G06F 3/1407 (2013.01); G09G 5/12 (2013.01); G09G 3/2092 (2013.01); G09G 2330/021 (2013.01); G09G 2340/0435 (2013.01); G09G 2370/04 (2013.01); G09G 2370/20 (2013.01); Y02B 60/1242 (2013.01)

(58) Field of Classification Search
CPC ..... G09G 2340/0435; G09G 2330/021; G09G 2330/02; H04N 7/01; H04N 7/0127; H04N 7/0122; H04N 7/09; H04N 7/7921; H04N 5/63

USPC ......... 348/441, 459, 558, 730; 345/204, 211
See application file for complete search history.

(56) References Cited

U.S. PATENT DOCUMENTS

| | | | | |
|---|---|---|---|---|
| 5,287,189 A | * | 2/1994 | Ersoz et al. | 348/588 |
| 6,054,980 A | * | 4/2000 | Eglit | 345/204 |
| 6,118,413 A | * | 9/2000 | Bril et al. | |
| 6,151,078 A | * | 11/2000 | Yoneda et al. | 348/558 |
| 6,262,763 B1 | * | 7/2001 | Totsuka et al. | 348/135 |
| 6,373,500 B1 | * | 4/2002 | Daniels | 345/632 |
| 6,449,426 B1 | * | 9/2002 | Suga et al. | 386/228 |
| 6,469,744 B1 | * | 10/2002 | Pearlstein | 348/554 |
| 6,542,198 B1 | * | 4/2003 | Hung et al. | 348/459 |
| 6,603,516 B1 | * | 8/2003 | Fujiwara et al. | 348/558 |
| 6,714,253 B2 | * | 3/2004 | Kim et al. | 348/556 |

(Continued)

OTHER PUBLICATIONS

Ahmad, Ishfaq, "Power and visual quality optimized video coding for mobile applications: research issues and some solutions", Retrieved at <<http://ieeexplore.ieee.org/stamp/stamp.jsp?arnumber=05202820>>, Multimedia and Expo (ICME), Jul. 3, 2009, pp. 1588-1589.

(Continued)

*Primary Examiner* — Brian Yenke
(74) *Attorney, Agent, or Firm* — Sunah Lee; Dan Choi; Micky Minhas

(57) ABSTRACT

A battery operated device, having a display with two or more available refresh rates, has its refresh rate selected so as to match the video frame rate of video data played back on the display. This selection is made by coordinating the resources in the device that are used to process the video from its reception through to its display.

20 Claims, 6 Drawing Sheets

(56) References Cited

U.S. PATENT DOCUMENTS

| | | | | |
|---|---|---|---|---|
| 6,862,022 | B2* | 3/2005 | Slupe | 345/207 |
| 7,071,992 | B2* | 7/2006 | Chen et al. | 348/441 |
| 7,098,930 | B2* | 8/2006 | MacInnis et al. | 345/629 |
| 7,119,803 | B2* | 10/2006 | Stanley et al. | 345/211 |
| 7,224,404 | B2* | 5/2007 | An et al. | 348/584 |
| 7,450,130 | B2* | 11/2008 | Swedberg et al. | 345/545 |
| 7,499,043 | B2* | 3/2009 | Vasqnez et al. | 345/212 |
| 7,570,259 | B2* | 8/2009 | Banginwar et al. | 345/211 |
| 7,639,312 | B2* | 12/2009 | Baba et al. | 348/790 |
| 7,671,873 | B1* | 3/2010 | Pierini et al. | 345/603 |
| 7,692,642 | B2* | 4/2010 | Wyatt | 345/211 |
| 7,825,931 | B2* | 11/2010 | Mawatari et al. | 345/501 |
| 7,844,842 | B2* | 11/2010 | Fard et al. | 713/300 |
| 7,898,535 | B2* | 3/2011 | Juenger | 345/204 |
| 7,903,107 | B2* | 3/2011 | Ostlund | 345/211 |
| 7,995,050 | B2* | 8/2011 | Wong et al. | 345/211 |
| 8,179,388 | B2* | 5/2012 | Wyatt et al. | 345/211 |
| 8,207,977 | B1* | 6/2012 | Kumar et al. | 345/519 |
| 8,284,210 | B1* | 10/2012 | Kumar et al. | 345/530 |
| 8,334,857 | B1* | 12/2012 | Ogrinc et al. | 345/204 |
| 8,451,279 | B2* | 5/2013 | Gorla et al. | 345/501 |
| 8,542,221 | B1* | 9/2013 | Wyatt et al. | 345/204 |
| 8,578,192 | B2* | 11/2013 | Vasquez et al. | 713/320 |
| 8,606,949 | B2* | 12/2013 | Wogsberg et al. | 709/231 |
| 2002/0162102 | A1* | 10/2002 | Ihara | 725/9 |
| 2003/0189571 | A1* | 10/2003 | MacInnis et al. | 345/505 |
| 2004/0090556 | A1* | 5/2004 | Kamieniecki et al. | 348/558 |
| 2006/0007200 | A1* | 1/2006 | Young et al. | 345/204 |
| 2006/0146056 | A1* | 7/2006 | Wyatt | 345/501 |
| 2007/0002036 | A1* | 1/2007 | Kardach et al. | 345/213 |
| 2007/0120763 | A1* | 5/2007 | De Paepe et al. | 345/1.3 |
| 2008/0055311 | A1 | 3/2008 | Aleksic et al. | |
| 2008/0100598 | A1* | 5/2008 | Juenger | 345/204 |
| 2008/0198264 | A1 | 8/2008 | Balram | |
| 2009/0016698 | A1* | 1/2009 | Oyaizu et al. | 386/124 |
| 2009/0169181 | A1 | 7/2009 | Priyadarshi et al. | |
| 2009/0313484 | A1 | 12/2009 | Millet et al. | |
| 2009/0327777 | A1* | 12/2009 | Vasquez et al. | 713/320 |
| 2010/0020886 | A1 | 1/2010 | Raveendran et al. | |
| 2010/0313154 | A1* | 12/2010 | Choi et al. | 715/765 |
| 2011/0032328 | A1 | 2/2011 | Raveendran et al. | |
| 2011/0109639 | A1 | 5/2011 | Sreenivas et al. | |
| 2011/0109792 | A1* | 5/2011 | Montag | 348/390.1 |
| 2013/0057519 | A1* | 3/2013 | Kerofsky et al. | 345/204 |

OTHER PUBLICATIONS

Nowlin, Dan H., "Video Frame Display Synchronization", Retrieved at <<http://software.intel.com/en-us/articles/video-frame-display-synchronization/>>, Jun. 19, 2009, pp. 4.

* cited by examiner

ADAPTIVE CONTROL OF DISPLAY REFRESH RATE BASED ON VIDEO FRAME RATE AND POWER EFFICIENCY

BACKGROUND

Video is commonly played on notebook and laptop computers, hand held devices, and mobile devices, such as smart phones and other battery operated devices. Playing back video can require significant hardware resources, involving significant power consumption. Playing back video on a battery operated device can cause the battery to drain quickly, reducing battery life.

It is common to lower the quality of the video, in an attempt to reduce the usage of hardware resources during playback. It is also common the drop the visual quality of the video to simplify the algorithms used to display the video, especially in the presence of other content. However, such processing is contrary to the desired user experience of viewing high quality video.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

If a computer system has a display with two or more available refresh rates, the refresh rate can be selected so as to match the video frame rate of video played back on the display. This selection is made by coordinating the resources in the device that are used to process the video from its reception through to its display. In particular, because higher refresh rates consume more system resources, and hence more battery power, lower refresh rates are desirable to increase battery life in battery operated devices.

Metadata providing the video frame rate can come from a source file or bit stream including the video data or from a processor that decodes or otherwise processes the video for playback. A display controller receives information about the available refresh rates for the display. The refresh rate of the display is then set to a refresh rate that optimizes the playback quality of the video, given the video frame rate. For example, the refresh rate can be the same as the video frame rate or an integer multiple of the video frame rate. If neither of these is available, a refresh rate higher than the video frame rate can be used. In this case, selected frames of the video will be repeated during playback.

The display controller may receive video data from a compositor component that combines video and other images from multiple sources. For example, the compositor may be a desktop rendering engine that combines graphic data from multiple windows and a desktop in a graphical user interface of a personal computing device. The compositor can instruct the display controller to set the refresh rate based on the video frame rates of multiple video sources. The compositor can receive information describing video frame rates from a source file, bit stream, metadata accompanying a source file or bit stream, and/or metadata output from a video processor. The frame rate information also can be provided in the form of presentation time stamps, from which a frame rate can be inferred. The use of presentation time stamps also allows the video processing to be independent of the refresh rate of the display.

In a more complex environment, the compositor component may be connected to multiple output devices. It can optimize each display frame rate and re-render the output to resample the data displayed.

In a desktop environment, applications can be programmed to provide both video data and video frame rate information. In the absence of such information, the compositor can turn off the capability of adjusting the refresh rate. Such applications also can be programmed to receive information about the refresh rate, or changes thereto, and to modify their processing accordingly.

Accordingly, in one aspect, a computer implemented process includes a video frame rate is determined for video data including a sequence of images to be played back at the video frame rate. Available refresh rates for a display where the moving picture is to be displayed also are determined. A refresh rate of the display is selected from among the available refresh rates according to the determined rate of display of images. The refresh rate of the display is set to the selected refresh rate.

In another aspect, an article of manufacture includes a computer storage medium, with computer program instructions stored on the computer storage medium which, when processed by a processing device, instruct the processing device to perform a process. This process involves determining a video frame rate for video data including a sequence of images to be played back at the video frame rate. Available refresh rates for a display where the moving picture is to be displayed also are determined. A refresh rate of the display is selected from among the available refresh rates according to the determined rate of display of images. The refresh rate of the display is set to the selected refresh rate.

In another aspect, a computing machine includes a display controller and a rate selection module. The display controller has an input for receiving an indication of a selected refresh rate, and an output providing information about available refresh rates for a display. A rate selection module has an input for receiving information about video data to be played back on the display, and an input for receiving the information about the available refresh rates, and an output to the display controller indicating a selected refresh rate according to a video frame rate of the video data.

In various implementations, determining the video frame rate comprises reading metadata from a bit stream encoding the moving picture, the metadata including data defining the video frame rate. The metadata can include the video frame rate. The metadata can include presentation time stamps associated with each image. The frame rate also can be present in the data, typically a multiplexed container, that includes the bitstream. As video data moves down a processing pipeline, a reliability measure can be associated with the metadata. Each component can provide information of varying accuracy, allowing the compositing component to select information used based on the reliability measure.

In various implementations, determining the available refresh rates comprises requesting the available refresh rates for the display. Determining the available refresh rates can include receiving the available refresh rates for the display.

Selecting the refresh rate can include selecting a refresh rate higher than the video frame rate. The refresh rate can be an integer multiple of the rate of display. If the refresh rate is not an integer multiple of the rate of display, one or more images can be repeated during playback.

If the video frame rate is variable, the determination of the video frame rate for a frame, and the selection of the refresh rate, are repeated during playback of the video to adapt the refresh rate to the video frame rate.

In some implementations, determining the video frame rate can include determining a first video frame rate for a first playback stream, determining a second video frame rate for a second playback stream, and selecting the refresh rate according to both the first video frame rate and the second video frame rate. Selecting the refresh rate can include selecting the refresh rate according to a least common multiple of both the first video frame rate and the second video frame rate. Selecting the refresh rate can include selecting the refresh rate according to the higher of the first video frame rate and the second video frame rate. Selecting the refresh rate can include selecting one of the first video frame rate and the second video frame rate, and selecting the refresh rate according to the selected video frame rate. The selected refresh rate can be a lowest available refresh rate higher than the selected video frame rate. If a first playback stream includes one of graphics animation, display related to touch input, and a video game, and the video frame rate of this first playback stream can be used to select the refresh rate.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which the dynamic adjustment of a refresh rate can be implemented.

Figure 1:
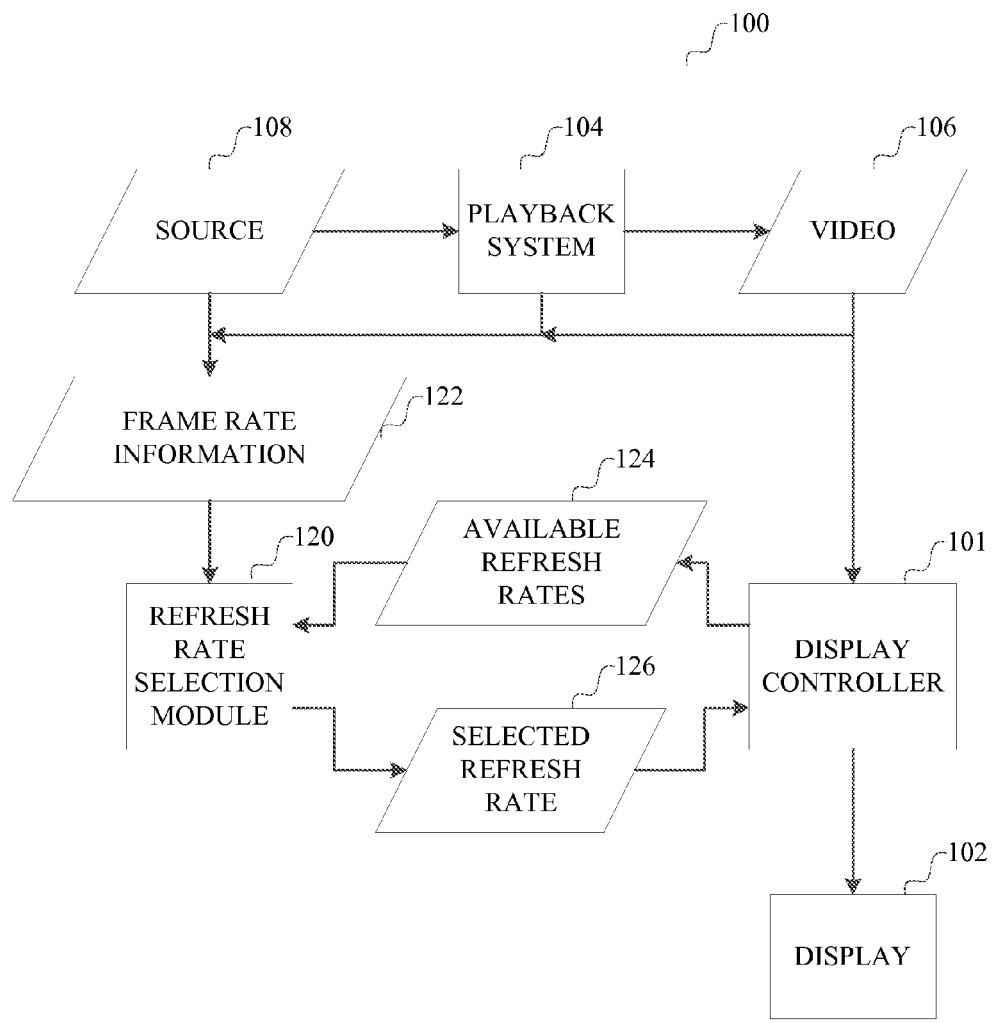
FIG. 1 is a block diagram of an example operating environment in which dynamic adjustment of a display refresh rate can be used with one source of video.

Referring to FIG. 1, a computer system 100 includes a display controller 101 that connects to a display 102 with multiple available refresh rates. Typical refresh rates include, but are not limited to, 60 Hz, 50 Hz, 59.94 Hz, 48 Hz, 72 Hz, 100 Hz and 120 Hz. These rates correspond to typical video frame rates used in film and television, including 24, 29.97, 25, 30, 48, 50, 59.94, and 60 frames per second (fps). Some displays may have only one refresh rate, others may have two different refresh rates, whereas yet other displays may have several refresh rates. Some displays support variable update rates and can be "pushed" frames.

Example computer systems 100 include but are not limited to notebook and laptop computers, hand held computers, mobile devices including mobile phones, and the like, which are described in more detail below in connection with FIG. 6. Example displays include liquid crystal displays (LCD), touchscreens, cathode ray tube (CRT) devices and the like.

While the dynamic selection of a refresh rate for a display can be applied to any display (with more than one refresh rate) for any computer system, such as a desktop computer with CRT display, it is particularly useful for battery operated devices for the purpose of reducing power consumption, and thus increasing battery life. The display controller 101 allows the computer system 100 to set the refresh rate of the display 102.

In the computer system 100, a playback system 104 receives video data 106 from a source 108 to generate video data 110 to be displayed on the display 102 via the display controller 101. Examples of sources 108 are, but are not limited to: a server that is streaming video data over a computer network, or a storage device storing video data in a computer data file, an analog video source from which video data 106 is being captured, and the like.

A refresh rate selection module 120 receives information 122 describing the frame rate of the video 110 and the available refresh rates 124 from the display controller to select a refresh rate 126 for the display 102. The display controller is instructed to set the refresh rate of the display.

The information describing the frame rate of the video can be provided by the source 108, the playback system 104, the video data 106 and/or the video data 110. For example, the source 108 can be a data file, and the frame rate may be specified by information in the data file. For example, the data file may include header information that explicitly indicates the frame rate. A data file, or the video data 106, or the video data 110, also may include presentation time stamps for each image, from which a frame rate can be derived. Metadata in data, typically a multiplexed container, that includes a bit stream encoding the video also can be used. The playback system 104 also can derive a frame rate from decoding and otherwise processing the video information. For example, if the playback system performs deinterlacing, it can indicate a new frame rate for its deinterlaced output. As video data moves down a processing pipeline, a reliability measure can be associated with the metadata. Each component can provide information of varying accuracy, allowing the compositing component to select information used based on the reliability measure.

The refresh rate selection module 120 can determine the refresh rate 126 in a number of ways. For example, if a refresh rate identical to the video frame rate is available, then that refresh rate can be selected. If a refresh rate that is an integer multiple of the video frame rate is available, then that refresh rate can be selected. If no refresh rate matches the video frame rate, then a higher refresh rate can be selected, with the result that some images in the video will be repeated.

Figure 2:
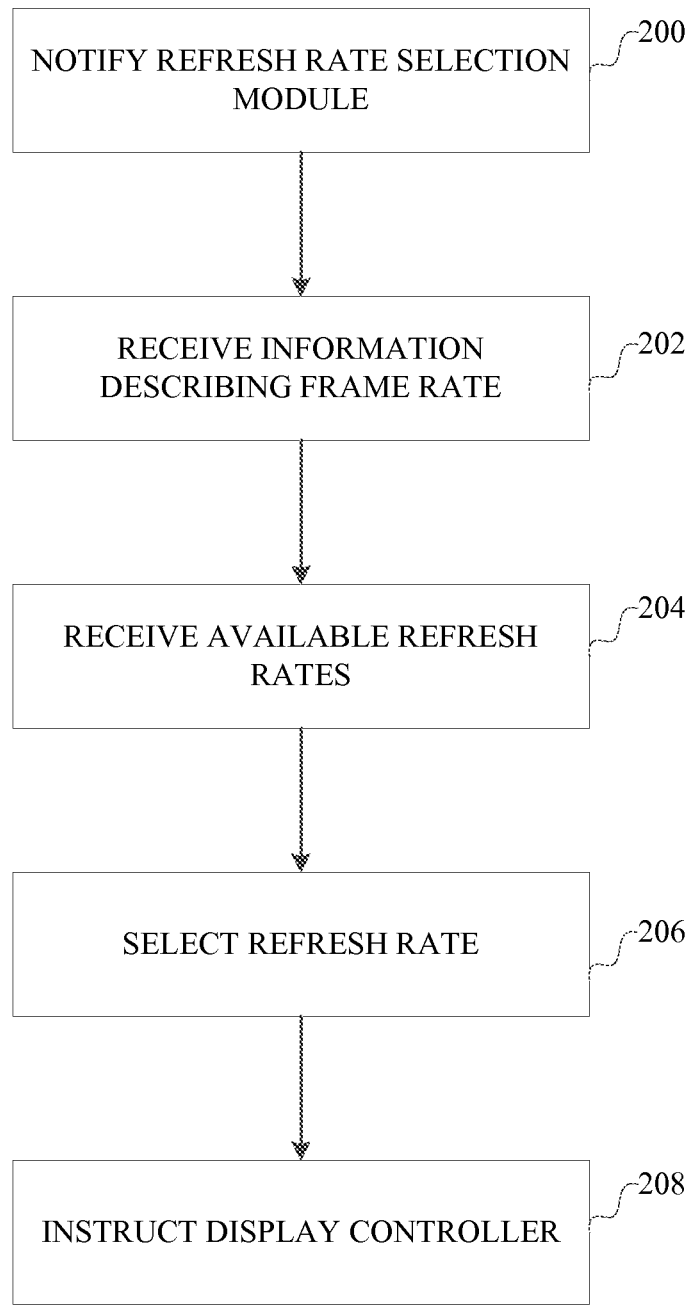
FIG. 2 is a flow chart describing an example operation of the system in FIG. 1.

A flowchart describing an example operation of a system in FIG. 1 will now be described in connection with FIG. 2.

Playback of video is initiated, for example by the playback system, and the refresh rate selection module is notified 200. This refresh rate selection module receives 202 information describing the video frame rate. The refresh rate selection module also receives 204 the available refresh rates from the display controller. Given the video frame rate and the available refresh rates, the module selects 206 a refresh rate. The module instructs 208 the display controller to set the refresh rate to the selected refresh rate.

A more detailed example implementation of dynamic refresh rate selection will be described in connection with FIGS. 3-4. In this implementation, multiple video sources are processed and combined together into a single display, as would be typical with videos played in different windows on a desktop-style graphical user interface.

Figure 3:
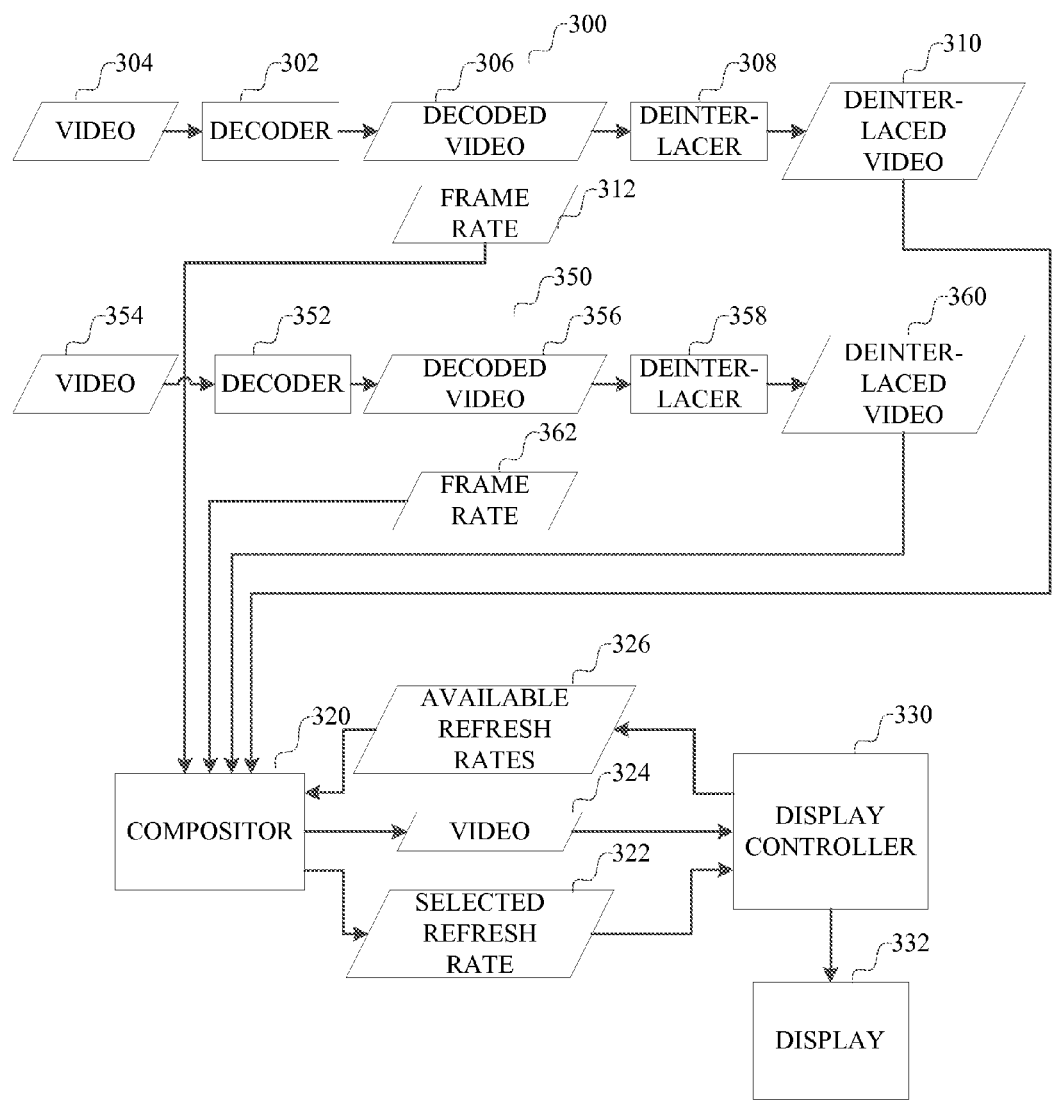
FIG. 3 is a block diagram of an example operating environment in which dynamic adjustment of a display refresh rate can be used with multiple sources of video.

In FIG. 3, there are two (or more) playback streams 300 and 350. Each playback stream includes a video decoder 302, 352 that receives video data 304, 354. The video decoder processes the video data 304, 354 to decode and/or decompress the video to provide video data 306, 356.

In some implementations, a deinterlacer 308, 358 can process the decoded video data and remove interlacing, providing deinterlaced video 310, 360. There are a variety of forms of deinterlacing, and such deinterlacing and change the effective frame rate. For example, if video received at 29.97 fps is deinterlaced, and such deinterlacing detects that the video includes pulldown (i.e., repeated) fields, such fields can be removed and the rate of the video could be changed (e.g., to 24 fps).

Each of the stages of playback streams 300, 350 (e.g., decoder, deinterlacer, decoded video data, deinterlaced video data) can provide information 312, 362 about the video frame rate.

The playback streams 300, 350 each provide video data (e.g., 310, 360) to a compositor 320. The compositor can be any processing module that combines the video streams into output display data 322. For example, the compositor can be a desktop rendering engine that produces a desktop-style graphical user interface using information provided by several applications in several windows on a background. The compositor 320 receives the information about the video frame rate 312, 362 from each playback stream. The compositor 320 combines the information about the video frame rates to select a refresh rate 324 that is appropriate for both playback streams when composited. The output display data 322 and selected refresh rate 324 are provided to the display controller 330, which sets the refresh rate of the display 332 and displays the video data.

There are many ways in which the compositor can set the refresh rate. For example, if both video rates are the same, then this case is identical to setting the refresh rate for a single frame of video. If both video rates are different, and one video rate is an integer multiple of the other video rate, then the high video frame rate can be used to select the refresh rate. If both video rates are different, then a number of different heuristics can be used, depending on the desired user experience. For example, the higher video frame rate can be selected and used to determine the refresh rate. Alternatively, the refresh rate can be selected based on the least common multiple of the video frame rates. As another alternative, the video frame rate of the most prominent video stream (e.g., taking up a larger portion of the display) could be used to select the refresh rate (so long as the refresh rate is greater than both of the video frame rates. Similar decisions would be made if there are three or even more playback streams.

In some implementations, stages of the playback streams can be implemented so as to listen for frame rate changes and adapt their outputs to a desired rate. A compositor component can notify the stages of the playback stream as to the selected rate to allow them to adapt. In some implementations, stages of the playback streams can opt in to the ability to adapt to refresh rate changes. In this case, the compositor can be implemented to change the frame rate only if all of the stages opt in to the frame rate change.

In general, the lowest available refresh rate that is higher than a selected one of the video frame rates is selected. However, in some cases, a desirable user experience is provided by limiting the minimum refresh rate. For example, the selected refresh rate also affects graphic animations, games and input devices (such screen-related inputs and touch inputs). If the selected refresh rate is too low it can make the user experience for such input devices very slow. In particular there may be a high latency between a user action and a display update related to that user action. In such cases, the most prominent video stream may be the display associated with a touch input or game or animation, and the video frame rate of that video stream may be given precedence over other video streams.

Figure 4:
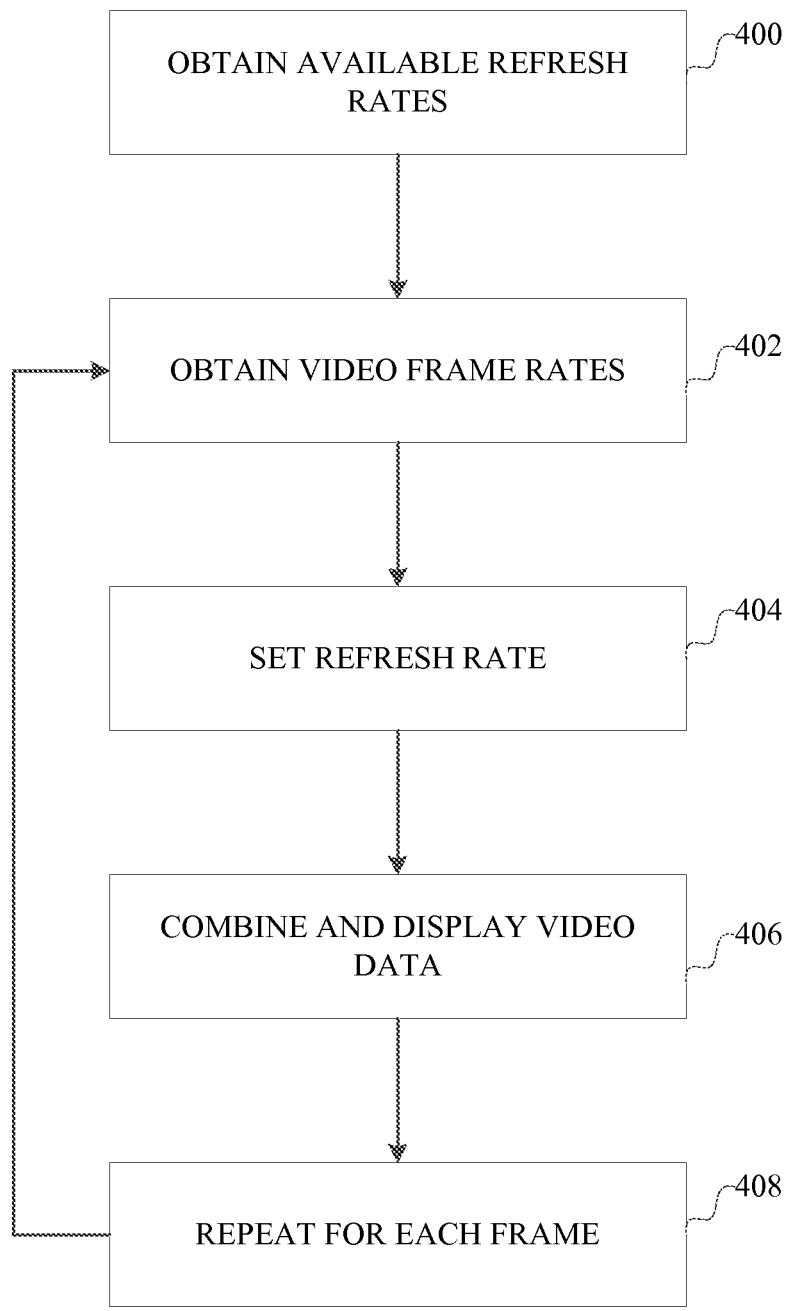
FIG. 4 is a flow chart describing an example operation of the system in FIG. 3.

FIG. 4 is a flowchart describing an example operation of the compositor in FIG. 3 with respect to setting the refresh rate. The compositor determines 400 the available refresh rates of the display. For example, the compositor can query the display controller for this information. The compositor then determines 402 the video data rate for the video data from each playback stream. As noted above, the video rate could be determined from metadata from a source file, from data in the video bit stream, from data from a deinterlacer or the deinterlaced video stream. Given the video rates of the playback streams, and the available refresh rates, the compositor selects 408 a refresh rate in the manner described above. The compositor receives and combines 406 the video data from each playback stream according to compositing instructions it receives, generating composited video data at the selected refresh rate. Steps 402 through 408 can be repeated 410 for each video frame.

It is possible that the video frame rates can vary over time. In the worst case, the instantaneous video frame rate of each playback stream can be different for each frame. To limit frequent changes to the refresh rate, a number of frames can be set as a minimum number for which a refresh rate is effective.

Figure 5:
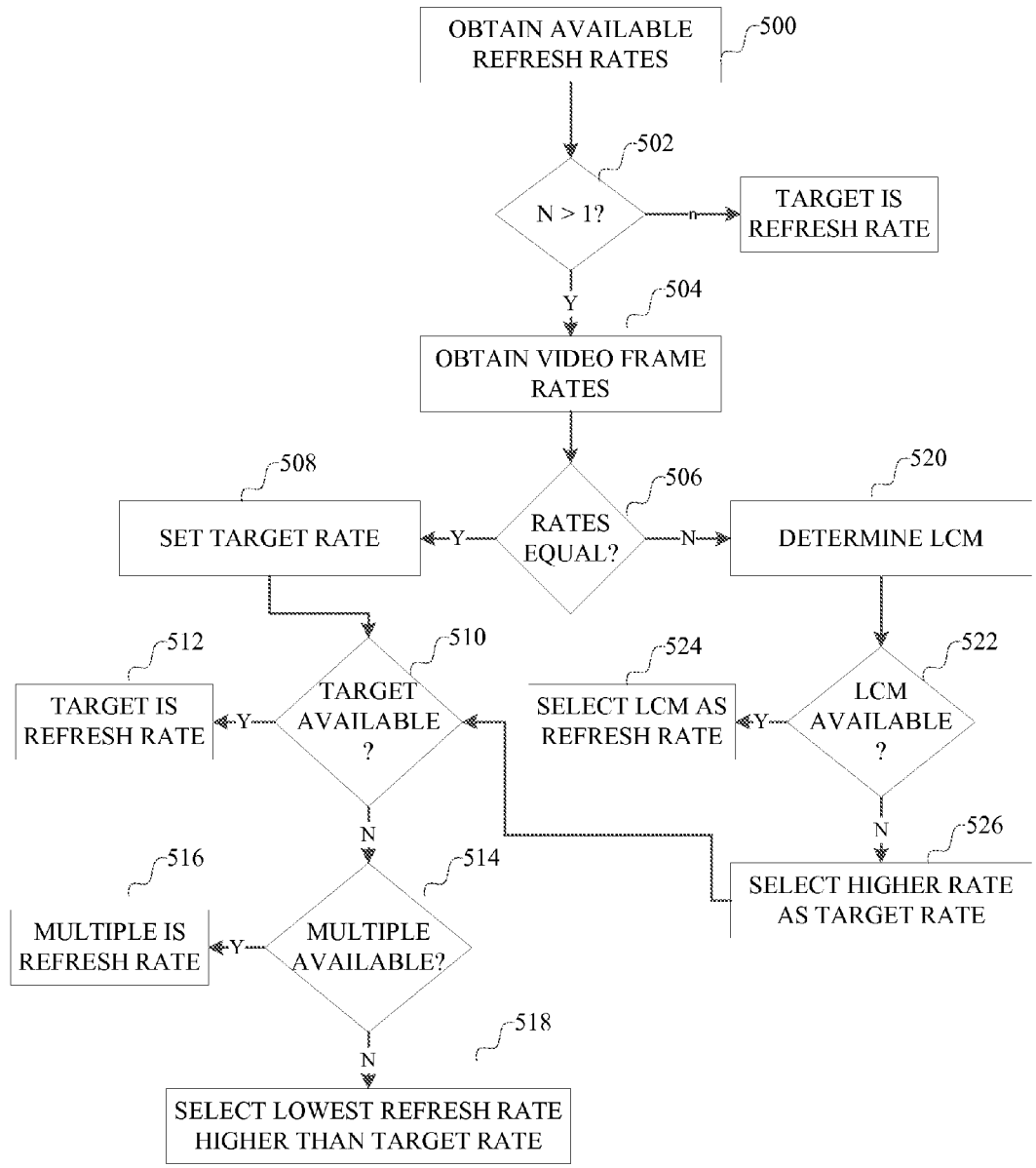
FIG. 5 is a flow chart describing an example implementation of setting a refresh rate.

Referring now to FIG. 5, an example implementation of setting a refresh rate will now be described. In this example, two playback streams are considered. The available refresh rates are obtained 500. If there is only one refresh rate, as determined at 502, then that refresh rate is selected and the process ends 504. The video frame rates are then obtained 506. Reliability data can be used in this selection process, and the source frame rates, frames rates output by a decoder, and deinterlacer analysis data can be used to further specify the video frame rate for each playback stream.

If the video frame rates are equal, as determined at 508, then one of the rates is selected 510 as the target rate to be used to select the refresh rate. If this target rate is an available refresh rate, as determined at 512, it is selected 514 as the refresh rate. Otherwise, if a multiple of the target rate is an available refresh rate, as determined at 516, then it is selected 518 as the refresh rate. If neither of those conditions (512, 516) is met then an available refresh rate, preferably the lowest refresh rate that is higher than the target rate, is selected 520.

If the video frame rates are not equal, then a least common multiple of the rates is determined 522. If this least common multiple is one of the available refresh rates, as determined at 524, then this least common multiple is selected 526 as the refresh rate. Otherwise, the higher video frame rate is selected 528 as the target rate, and the selection process resumes with step 512.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
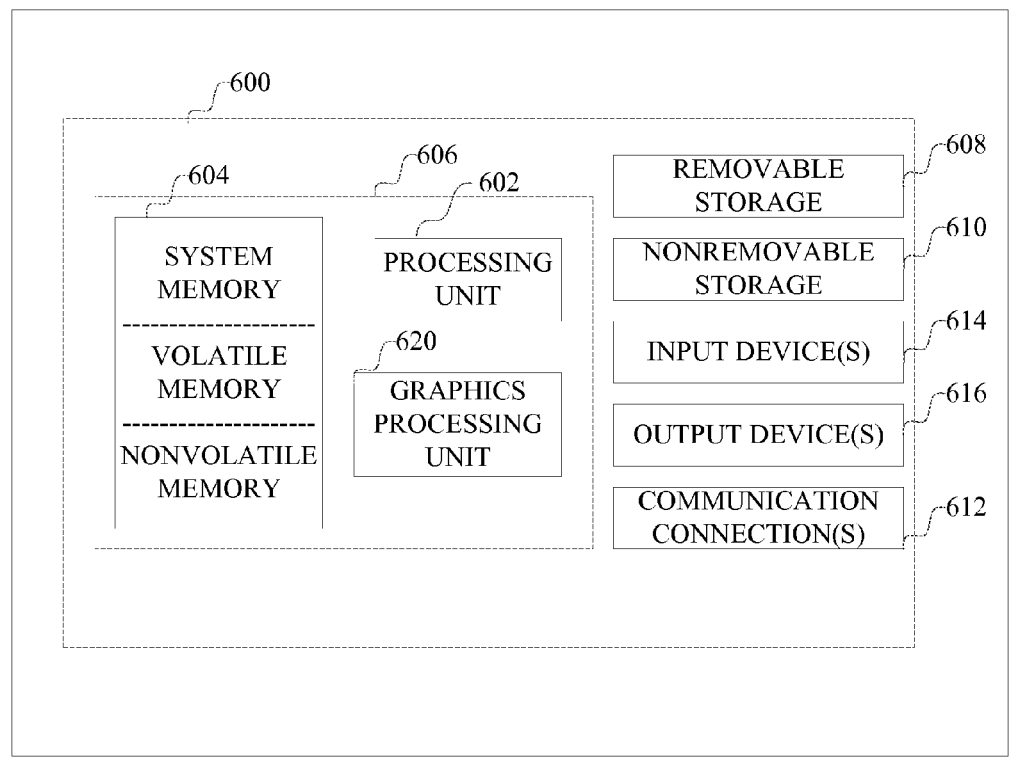
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here.

Such a system can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process, performed by a compositor of a desktop rendering engine in a computer, the compositor combining graphic data, from multiple windows provided by applications executed on the computer, with a background, to produce a graphical user interface for the computer on a display for the computer, the process comprising:

the compositor receiving, from a first application executed on the computer, a sequence of images at a first video frame rate;

the compositor receiving information identifying the first video frame rate for the sequence of images;

the compositor accessing, from a second application executed on the computer, graphic data at a second frame rate;

the compositor receiving information identifying the second video frame rate for the graphic data;

the compositor receiving information identifying available refresh rates for the display where the graphical user interface is to be displayed;

the compositor selecting a refresh rate for the display from among the available refresh rates based on at least the first video frame rate and the second video frame rate by:

in response to a determination that the first video frame rate and the second video frame rate are not equal, and that a least common multiple of the first video frame rate and the second video frame rate is an available refresh rate, selecting the least common multiple as the refresh rate;

in response to a determination that the least common multiple of the first video frame rate and the second video frame rate is not an available refresh rate, selecting a higher rate of the first video frame rate and the second video frame rate as a target rate;

in response to a determination that an integer multiple of the target rate is an available refresh rate, selecting the integer multiple of the target rate as the refresh rate; and in response to a determination that an integer multiple of the target rate is not an available refresh rate, selecting a lowest available refresh rate higher than the target rate as the refresh rate;

the compositor generating, at the selected refresh rate, output display data for the graphical user interface by combining an image from the sequence of images from the first application and the graphic data from the second application with the background;

the compositor providing the output display data to the display at the selected refresh rate; and the compositor setting the refresh rate of the display to the selected refresh rate.

2. The computer-implemented process of claim 1, wherein determining the first video frame rate comprises reading metadata from data including a bitstream encoding the sequence of images, the metadata including data defining the first video frame rate.

3. The computer-implemented process of claim 2, wherein determining the first video frame rate comprises receiving reliability data regarding the first video frame rate.

4. The computer-implemented process of claim 2, wherein the metadata comprises presentation time stamps associated with each image in the sequence of images.

5. The computer-implemented process of claim 1, wherein when the selected refresh rate is not an integer multiple of the first video frame rate, one or more images of the sequence of images is repeated of the sequence of images by the compositor in the output display data during playback.

6. The computer-implemented process of claim 1, wherein the first video frame rate is variable, and determining the first video frame rate and selecting the refresh rate are repeated during playback of the sequence of images to adapt the refresh rate to the first video frame rate.

7. The computer-implemented process of claim 1, wherein when the sequence of images from the first application includes one of graphics animation, display related to touch input, and a video game, the first video frame rate is used to select the refresh rate.

8. The computer-implemented process of claim 1, further comprising: the compositor providing information about the selected frame rate to the first and second applications.

9. The computer-implemented process of claim 1, wherein selecting the refresh rate comprises:

in response to a determination that the first video frame rate and the second video frame rate are equal, selecting one of the first video frame rate and the second video frame rate as a target rate;

in response to a determination that the target rate is an available refresh rate, selecting the target rate as the refresh rate.

10. The computer-implemented process of claim 1, wherein the sequence of images from the first application includes display data corresponding to touch inputs to the first application, and wherein selecting the refresh rate comprises selecting an available refresh rate higher than the first video frame rate.

11. An article of manufacture comprising:

at least one of memory or nonvolatile storage;

computer program instructions of a compositor, of a desktop rendering engine of a computer, stored on the at least one of memory or nonvolatile storage, the compositor combining graphic data, from multiple windows provided by applications executed on a computer, with a background, to produce a graphical user interface for the computer on a display for the computer, wherein the compositor, when executed by the computer, instructs the computer to perform a process comprising:

the compositor receiving information identifying a first video frame rate for a sequence of images to be played back at the first video frame rate and received from a first application executed on the computer;

the compositor receiving information identifying a second video frame rate for graphic data received from a second application executed on the computer;

the compositor receiving information identifying available refresh rates for the display where the graphical user interface is to be displayed;

the compositor selecting a refresh rate of the display from among the available refresh rates according to at least the first video frame rate and the second video frame rate by:

in response to a determination that the first video frame rate and the second video frame rate are not equal, and that a least common multiple of the first video frame rate and the second video frame rate is an available refresh rate, selecting the least common multiple as the refresh rate;

in response to a determination that the least common multiple of the first video frame rate and the second video frame rate is not an available refresh rate, selecting a higher rate of the first video frame rate and the second video frame rate as a target rate;

in response to a determination that an integer multiple of the target rate is an available refresh rate, selecting the integer multiple of the target rate as the refresh rate; and in response to a determination that an integer multiple of the target rate is not an available refresh rate, selecting a lowest available refresh rate higher than the target rate as the refresh rate;

the compositor generating output display data for the graphical user interface by combining the sequence of images from the first application and the graphic data from the second application with the background and providing the output display data to the display at a frame rate corresponding to the selected refresh rate; and the compositor setting the refresh rate of the display to the selected refresh rate.

12. The article of manufacture of claim 11, wherein the first video frame rate is variable, and determining the first video frame rate and selecting the refresh rate are repeated during playback of the sequence of images to adapt the refresh rate to the first video frame rate.

13. The article of manufacture of claim 11, further comprising: the compositor providing information about the selected frame rate to the first and second applications.

14. The article of manufacture of claim 11, wherein selecting the refresh rate comprises:

in response to a determination that the first video frame rate and the second video frame rate are equal, selecting one of the first video frame rate and the second video frame rate as a target rate; and in response to a determination that the target rate is an available refresh rate, selecting the target rate as the refresh rate.

15. The article of manufacture of claim 11, wherein the sequence of images from the first application includes display data corresponding to touch inputs to the first application, and wherein selecting the refresh rate comprises selecting an available refresh rate higher than the first video frame rate.

16. A computing machine comprising:
a display controller having an input for receiving an indication of a selected refresh rate, and providing information about available refresh rates for a display; and
a compositor, of a desktop rendering engine providing a graphical user interface of a computer, having inputs for receiving graphic data, from multiple windows provided by applications executed on the computing machine, the graphic data including a sequence of images to be played back at a first video frame rate received from a first application executed on the computing machine and graphic data to be displayed at a second video frame rate received from a second application executed on the computing machine,
the compositor including a rate selection module having an input for receiving information about the first and second video frame rates, and an input for receiving the information about the available refresh rates, and providing an output to the display controller indicating a selected refresh rate, selected according to at least the first video frame rate and the second video frame rate, the rate selection module being further configured to:
in response to a determination that the first video frame rate and the second video frame rate are not equal, and that a least common multiple of the first video frame rate and the second video frame rate is an available refresh rate, select the least common multiple as the refresh rate;
in response to a determination that the least common multiple of the first video frame rate and the second video frame rate is not an available refresh rate, select a higher rate of the first video frame rate and the second video frame rate as a target rate;
in response to a determination that an integer multiple of the target rate is an available refresh rate, select the integer multiple of the target rate as the refresh rate; and
in response to a determination that an integer multiple of the target rate is not an available refresh rate, select a lowest available refresh rate higher than the target rate as the refresh rate;
the compositor further having an output providing output display data for the graphical user interface of the computing machine by combining the sequence of images from the first application and the graphic data from the second application with a background and providing the output display data to the display at a frame rate corresponding to the selected refresh rate.

17. The computing machine of claim 16, wherein the first video frame rate is variable, and the refresh rate is updated during playback of the sequence of images to adapt the refresh rate to the first video frame rate.

18. The computing machine of claim 16, wherein the compositor further provides information about the selected frame rate to the first and second applications.

19. The computing machine of claim 16, wherein to select the refresh rate, the rate selection module of the compositor is configured to:
in response to a determination that the first video frame rate and the second video frame rate are equal, select one of the first video frame rate and the second video frame rate as a target rate;
in response to a determination that the target rate is an available refresh rate, select the target rate as the refresh rate.

20. The computing machine of claim 16, wherein the sequence of images from the first application includes display data corresponding to touch inputs to the first application, and wherein selecting the refresh rate comprises selecting an available refresh rate higher than the first video frame rate.

* * * * *